United States Patent [19]

Klevnjans

[11] Patent Number: 4,799,342
[45] Date of Patent: Jan. 24, 1989

[54] COMBINED DOCK SEAL AND SHELTER
[75] Inventor: Joseph P. H. Klevnjans, Coraopolis, Pa.
[73] Assignee: Eriks Holding N.V., Alkmaar, Netherlands
[21] Appl. No.: 42,633
[22] Filed: Apr. 14, 1987

Related U.S. Application Data
[63] Continuation of Ser. No. 680,898, Dec. 12, 1984, abandoned.

[51] Int. Cl.⁴ .......................... E04F 10/04; E06B 1/66
[52] U.S. Cl. ................................. 52/173 DS
[58] Field of Search .................. 52/173 DS, 204, 288; 297/DIG. 8; 49/475

[56] References Cited
U.S. PATENT DOCUMENTS

| | | | |
|---|---|---|---|
| 3,276,048 | 10/1966 | Beckman | 297/DIG. 8 |
| 3,286,417 | 11/1966 | Dazzo | 49/475 |
| 3,352,314 | 11/1967 | Frommelt et al. | 52/173 DS |
| 3,375,625 | 4/1968 | Edkins et al. | 52/173 |
| 3,403,489 | 10/1968 | Frommelt et al. | 52/204 |
| 3,500,599 | 2/1970 | Sciolino | 52/204 |
| 3,613,324 | 10/1971 | Conger | 52/173 DS |
| 3,638,667 | 2/1972 | Frommelt | 52/173 DS |
| 3,683,572 | 8/1972 | Alten | 52/173 DS |
| 3,772,839 | 11/1973 | Timbers | 52/173 |
| 3,792,559 | 2/1974 | Frommelt et al. | 52/288 |
| 3,816,867 | 6/1974 | Shirzad et al. | 14/71 |
| 4,038,792 | 8/1977 | McGuire et al. | 248/345.1 |
| 4,070,801 | 1/1978 | O'Neal | 52/173 DS |
| 4,213,279 | 7/1980 | Layne | 52/173 DS |
| 4,389,821 | 6/1983 | O'Neal | 52/173 DS |

OTHER PUBLICATIONS
Webster's Ninth New Collegiate Dictionary, 1985, p. 172.

Primary Examiner—James L. Ridgill, Jr.
Attorney, Agent, or Firm—Joseph P. Gastel

[57] ABSTRACT

A combined dock seal and shelter consisting of a pair of spaced side members each having a side pad with a compressible foam core and a flap member having a portion attached to the outer surface of each side pad with each of the flap members having an overhanging portion extending inwardly toward each other beyond the side pads, each of the side pads having a longitudinal axis and the flap members having a greater resistance to bending about the longitudinal axes than the resistance which the cores have to compression so that the flap members are distorted less than the side pads are compressed when the flap members are deflected by a truck, and a bellows seal construction fixedly secured between the bottoms of the overhanging portions of the flap members and a building wall to provide sealing in this area.

31 Claims, 4 Drawing Sheets

COMBINED DOCK SEAL AND SHELTER

This is a continuation of application Ser. No. 680,898, filed Dec. 12, 1984, now abandoned.

BACKGROUND OF THE INVENTION

The present invention relates to a combined dock seal and shelter.

By way of background, there is now in common use a dock shelter construction in which the side members consist essentially of narrow vertical wood frames mounted perpendicularly to a building wall and which have flexible stay-reinforced fabric flaps affixed to their outer edges which provide sealing engagement with the sides of a truck. These prior shelters required steel guards to prevent a truck from backing into the wood frames and destroying them. Furthermore, even in instances where the truck did not contact the wood frames, if the truck was sufficiently off center, it could bend the stays beyond their elastic limits and thus permanently distort the shelter. The foregoing situation has become more pronounced with the advent of trucks which are 8½ feet wide as compared to the maximum prior dimension of 8 feet wide.

In addition to the foregoing, a prior art construction consisting of foam side flaps mounted on foam side panels is shown in U.S. Pat. No. 4,213,279. However, this patent relied primarily on the bending between the side flap and the side pad for providing sealing engagement. However, because of the softness of the foam material, the seal which this prior art structure provided was not as tight as with the structure of the present invention, and further the bending forces were of such a nature which could cause rapid deterioration in the areas of bending.

In the past, foam cushions of triangular solid shape were used as seals between the building wall and the bottoms of the side flaps of dock shelters. However, the intermittent extreme compression of the foam cushions caused them to deteriorate rapidly in use, with the attendant necessity to frequently replace them.

SUMMARY OF THE INVENTION

It is accordingly one object of the present invention to provide an improved combined dock seal and shelter which will provide good sealing engagement with trucks of different widths both when they are properly and improperly aligned therewith.

Another object of the present invention is to provide an improved combined dock seal and dock shelter structure which is highly resistant to wear and which cannot be destroyed or permanently distorted in cases where the truck is excessively misaligned therewith.

A further object of the present invention is to provide a bellows type of seal construction for use with a dock shelter, said bellows seal being easily installed and practically indestructible in use. Other objects and attendant advantages of the present invention will be readily perceived hereafter.

The present invention relates to a combined dock seal and shelter comprising a pair of spaced side members including substantially parallel vertical elongated side pad members having longitudinal axes, compressible flexible resilient cores in said side pad members, first sides on said side pad members for placement in contiguous relationship to a building wall, second sides on said side pad members on the opposite sides of said side pad members from said first sides in spaced relationship to said building wall, securing means for securing said side pad members to said building wall, said cores having a first resistance to compression from a normal unstressed condition, elongated flexible side flap members having first and second portions, means securing said first portions relative to said second sides with said second portions extending beyond said second sides toward each other, said side flap members having a second resistance to deflection from a normal unstressed condition in a direction about said longitudinal axes which is greater than said first resistance to compression, whereby when forces are applied to said second portions of said side flap members along paths which are substantially parallel to said longitudinal axes said elongated pad members will compress more easily than said side flap members will deflect.

The present invention also relates to a dock shelter construction for a building having a door opening and side wall portions on opposite sides of said door opening, the dock shelter construction comprising a pair of spaced side members, means mounting said side members on said side wall portions, flap members, means mounting said flap members on said side members, overhanging flap portions on said flap members extending inwardly toward each other from said side members, bellows seal means, and securing means affixing said bellows, seal means between said overhanging flap portions and said side wall portions to seal the space therebetween.

The present invention also relates to a bellows seal for a dock shelter comprising an accordian-like body member having opposite ends, vent means in said body member, and attachment means on said opposite ends for attaching said body member between a building wall and a dock shelter.

The various aspects of the present invention will be more fully understood when the following portions of the specification are read in conjunction with the accompanying drawings wherein:

BRIEF DESCRIPTION OF THE DRAWINGS

FIG. 10 is a fragmentary perspective view, partially broken away, of the top of the side member;

DESCRIPTION OF THE PREFERRED EMBODIMENTS

The combined dock seal and shelter 10 includes side members 11 and 11' which are mounted on spaced building wall portions 12 and 13 on opposite sides of door opening 14 in building wall 15. The combined dock seal and shelter 10 also includes a head member 16 mounted on building portion 17 above doorway 14.

Side members 11 and 11' are mirror image counterparts of each other and therefore only side member 11 will be described, as it can be understood that side member 11' possesss mirror image counterparts of structure which, in certain instances, will be designated by the same numerals as the elements of structure of side member 11, but which will have primes associated therewith.

Side member 11 includes a pad member 20 having a flexible resilient compressible core 21 which is preferably fabricated of polyurethane foam, but which may be of any other suitable material capable of providing the desired characteristics. Core 21 is elongated and extends the entire length of side member 11 and it includes sides 22, 23, 24 and 25, all of which are planar. Side 22 is in abutting relationship with side 26 of board 27 which extends the entire length of side member 11. A casing 29 of flexible durable waterproof material is located in contiguous relationship with sides 23, 24 and 25. One end portion of casing 29 is doubled over on itself at 30 and is held against the edge 31 of board 27 by a plurality of spaced screws 32 (FIG. 7) which bear against washers 33. The opposite edge portion 34 of casing 29 is stapled to the rear surface 35 (FIG. 2) of board 27 by a plurality of spaced staples 36. A metal strip 37 sandwiches a strip 39 of casing 29 between it and edge 40 of board 27 and strip 37 is held against casing portion 39 by screws 41. Casing 29 is preferably fabricated from a tough material known under the trademark HYPALON, or it may be any other suitable tough material, such as vinyl, rubberized fabric, or the like.

An end cap 43 (FIG. 10) is sewn to casing 29. Cap 43 includes downwardly turned edge portions 44, 45 and 46 which are sewn to bent over edge portions 47, 49 and 50, respectively, of casing 29 by a row of stitching 50'. The rear edge portion 51 of cap 43 is stapled to board 27 by a row of staples 52. The bottom of pad member 11 is closed by a cap 43a (FIG. 11) which is the mirror image counterpart of cap 43 and is secured to casing 29 and board 27 in an analogous manner.

Figure 1:
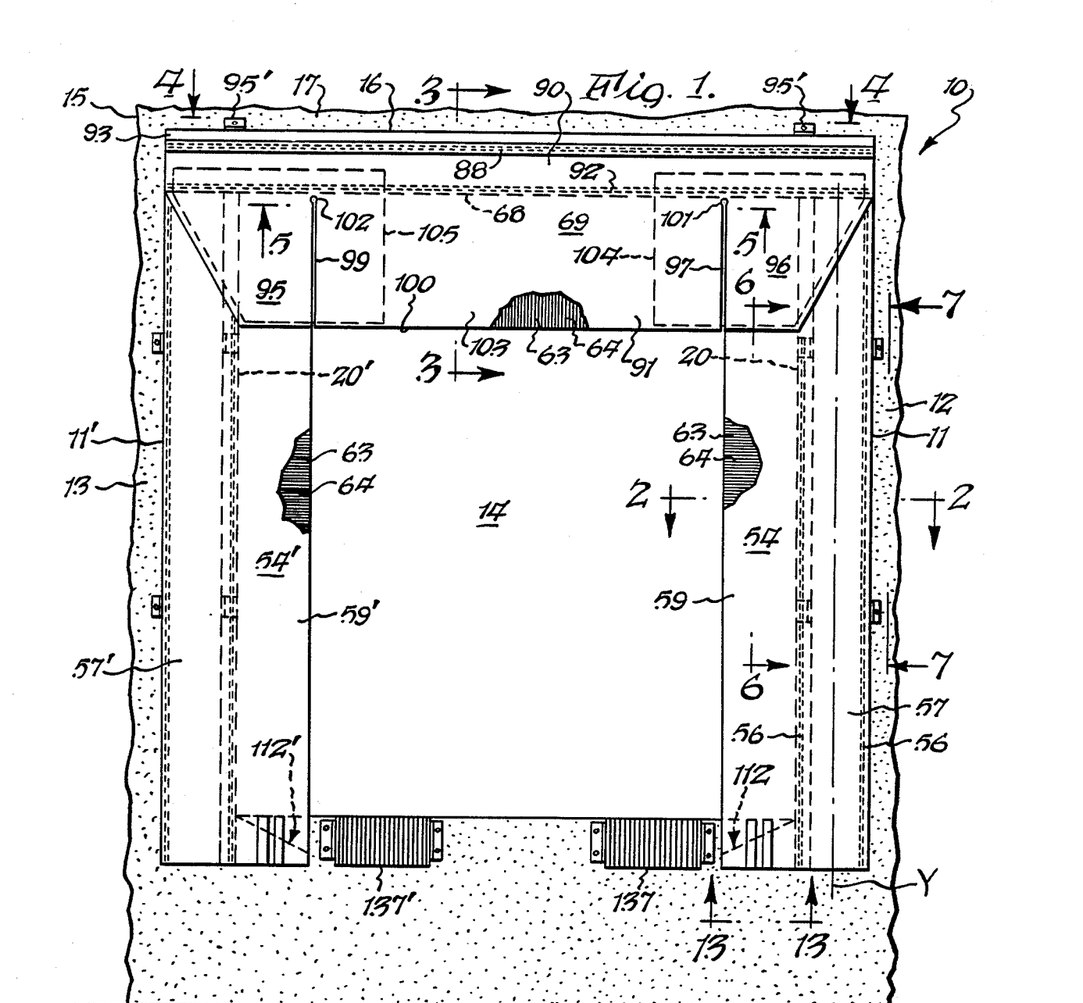
FIG. 1 is a front elevational view, partially broken away, of the combined dock seal and shelter of the present invention mounted relative to the doorway of a loading dock.
Figure 2:
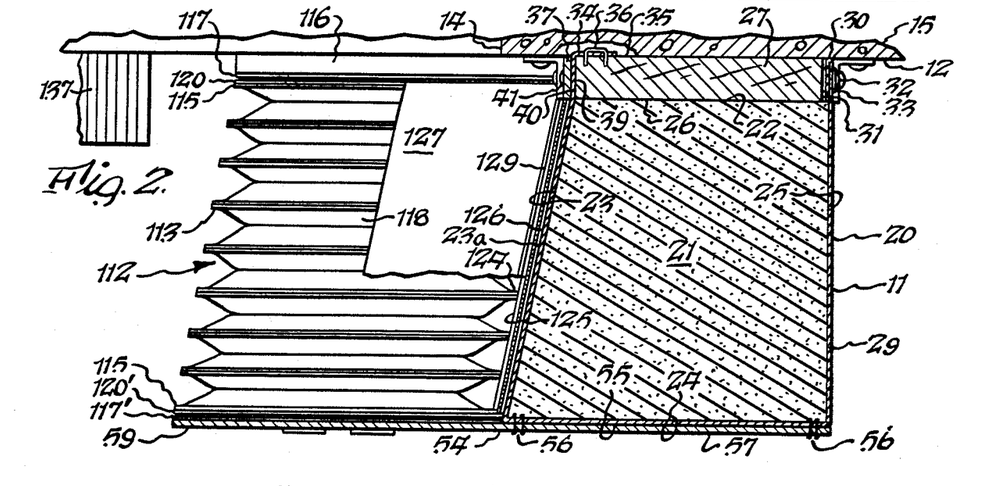
FIG. 2 is a fragmentary cross sectional view, partially broken away, taken substantially along line 2—2 of FIG. 1 showing the structure of one of the side members including its pad member, flap member and related structure.
Figures 3, 4, 5, 6, 7, 8, 9, 10A, 10B, 11:
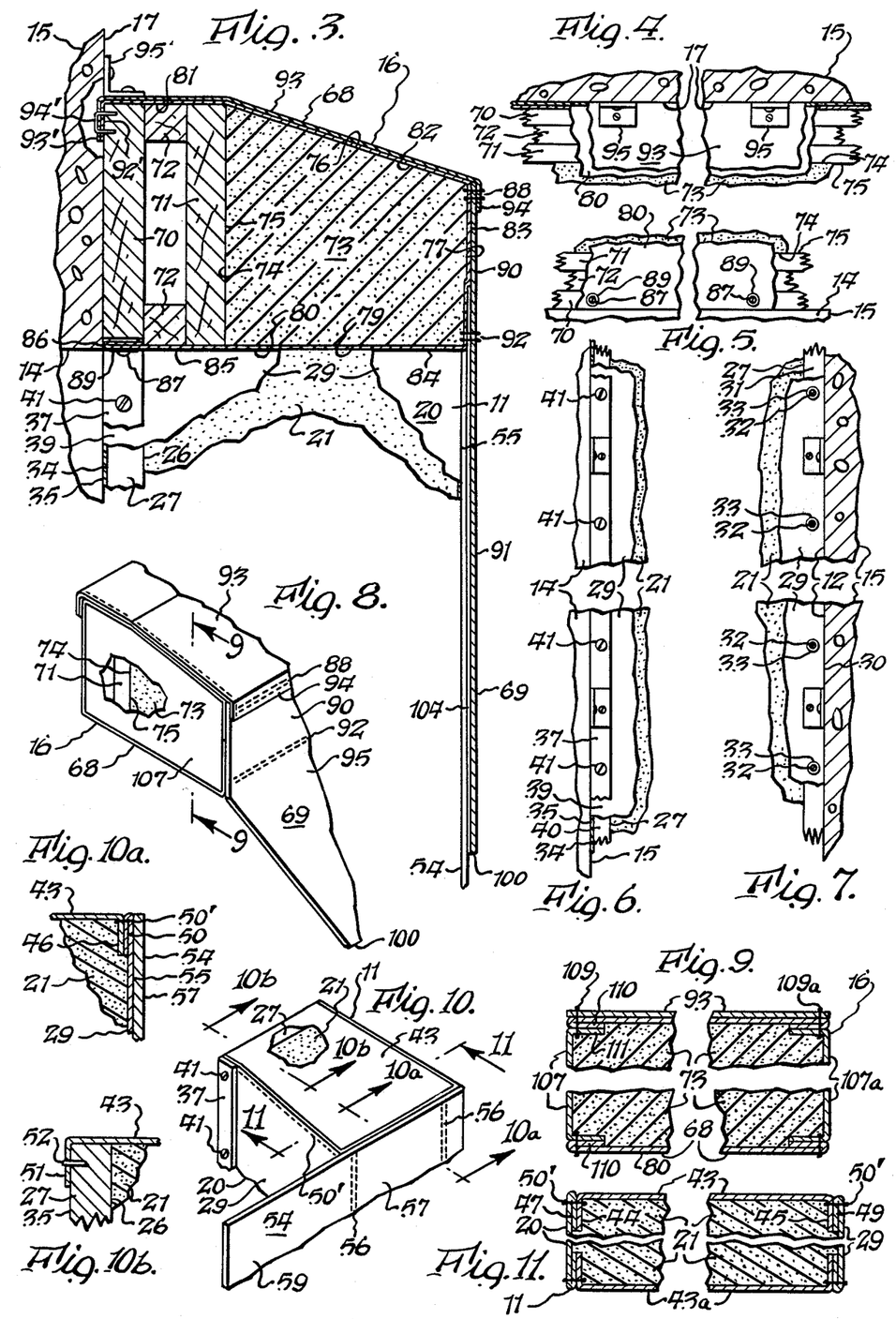
FIG. 3 is a fragmentary cross sectional view, partially broken away, taken substantially along line 3—3 of FIG. 1 showing the structure of the head member including its pad member, and its flap member and related structure.
FIG. 4 is a fragmentary cross sectional view, partially broken away, taken substantially along line 4—4 of FIG. 1 showing the structure of the head member and related structure.
FIG. 5 is a fragmentary cross sectional view, partially broken away, taken substantially along line 5—5 of FIG. 1 showing the structure of the head member and related structure.
FIG. 6 is a fragmentary cross sectional view, partially broken away, taken substantially along line 6—6 of FIG. 1 showing the side member and related structure.
FIG. 7 is a fragmentary cross sectional view, partially broken away, taken substantially along line 7—7 of FIG. 1 showing the side member and related structure.
FIG. 8 is a fragmentary perspective view, partially broken away, of the head member including its pad member and flap member.
FIG. 9 is a fragmentary cross sectional view, taken substantially along line 9—9 of FIG. 8.
FIG. 10A is a fragmentary cross-sectional veiw taken substantially along line 10A—10A of FIG. 10.
FIG. 10B is a fragmentary cross sectional view taken substantially along line 10B—10B of FIG. 10.
FIG. 11 is a fragmentary cross sectional view taken substantially along line 11—11 of FIG. 10.
Figure 14:
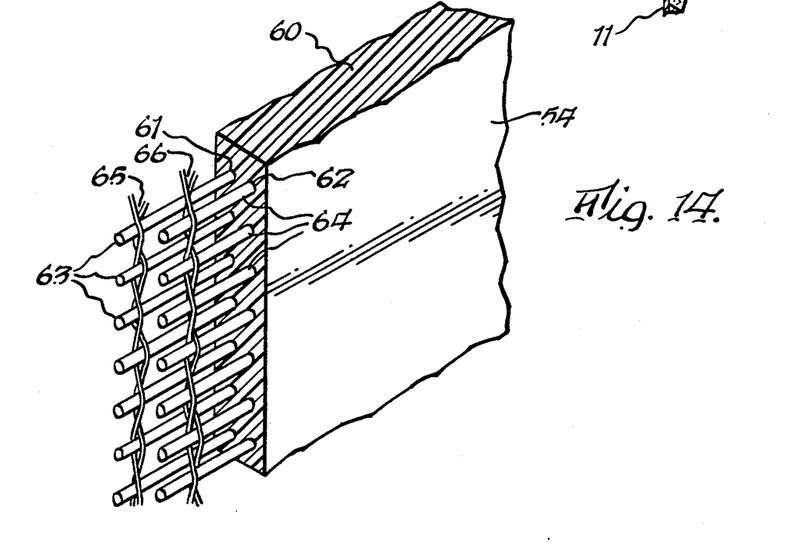
FIG. 14 is an enlarged fragmentary perspective view of the structure of the material of the flap which is secured to the various pad members.

An elongated flexible flap member 54 is attached to front face 55 of casing 29 by spaced double rows 56 of stitching. Face 55 of casing 29 lies in contiguous relationship to side 24 of core 21 (FIG. 2). Flexible flap member 54 includes a first portion 57 which is in contiguous abutting relationship with section 55 of casing 29, and it includes a second portion 59 which extends outwardly beyond pad member 11 (FIGS. 1, 2 and 10). Flap portion 59 extends at an obtuse angle to side 23 of the foam core, and sides 23 and 24 of the foam core are at an acute angle to each other. Flap member 54 is fabricated from a material known under the trademark FLEXILON which includes a very tough plastic matrix 60 (FIG. 14) with two rows 61 and 62 of metal tubes 63 and 64, respectively, held together by strands 65 and 66, respectively, which are embedded in matrix 60. When flexible flap member 54 is in its secured condition on pad member 11, rods 63 and 64 extend horizontally in FIG. 1. Therefore, flexible flap member 54 will be much stiffer when forces are applied thereto for bending it about a vertical axis Y in FIG. 1 than the forces required to bend it around a horizontal axis in FIG. 1. In other words, when a force is applied to flap member 54 tending to bend it about the vertical axis Y (FIG. 1) of pad member 11, the force will be crosswise to tubes 63 and 64 which have a high resistance to bending. However, if forces are applied to flap member 54 tending to bend it about axes which are parallel to tubes 63 and 64, the flap member 59 will bend much more easily because such bending force is resisted only by the matrix 60 between rods 63 and 64.

Head member 16 includes a head pad member 68 and a head flap member 69. Head pad member 68 includes a wooden framework consisting of boards 70 and 71 attached to each other by spacer bars 72. An elongated foam core 73 has a side 74 which is in contiguous abutting relationship to side 75 of board 71. Core member 73 also includes sides 76, 77 and 79. A head pad casing 80 includes a portion 81 which extends across the top surfaces of boards 70 and 71 and spacer bar 72, and it also includes a portion 82 which is in contiguous relationship to side 76 of core 73, a portion 83 which is in contiguous relationship to side 77 of core 73, a portion 84 which is in contiguous relationship to side 79 of core 73 and a portion 85 which is in contiguous relationship to adjacent portions of board 71 and bar 72. Core 73 is made of the same material as core 21, which is preferably polyurethane foam which is flexible, resilient, and compressible. The outer end portion 86 of casing 82 is doubled over on itself and secured to the underside of board 70 by spaced screws 87 which bear on washers 89.

Head flap member 69 includes attachment portion 90 and flap portion 91. Attachment portion 90 is secured to portion 83 of casing 80 by double rows of stitching 88 and 92. A cover 93 has an end portion 94 which overlies the joint between casing portion 83 and flap portion 90 and is secured to the latter by the above-mentioned double row of stitching 88. Rear edge portions 92' and 93' of casing 80 and cover 93, respectively, are attached to the rear of board 70 by spaced staples 94'. Head member 16 rests on the ends of side members 11 and 11' and is secured to wall surface 17 by suitable angles 95'. Head flap member 69 is fabricated from the above-described FLEXILON material, and it is oriented with the rods 63 and 64 extending vertically. The outer end portions 95 and 96 of head flap member 69 overlie the upper portions (not numbered) of side flap members 54 and 54'. Elongated slits 97 and 99 extend from the bottom edge 100 of head flap member 69 to enlarged openings 101 and 102, respectively, to permit end portions 85 and 96 to move independently of central portion 103 therebetween when the upper corners of a truck press against head flap 69. Panels 104 and 105, which are designated by dotted lines in FIG. 1, are sewn between casing portion 83 and head flap member portion 90 by row of stitching 92, but are not otherwise secured to any of the parts. Thus, the lower portions of flaps 104 and 105 hang free and function to close the openings of slits 97 and 99 when the lower portion 91 of head flap member 69 is deflected by the rear of a truck.

An end panel 107 (FIG. 8) is sewn to casing 80 by a row of stitching 109 which extends through the doubled-over end portion 110 of casing 80 and the portion 111 of end panel 107. A mirror image end panel 107a (FIG. 9) is attached to the other end of casing 80 by means of a row of stitching 109a.

A bellows seal 112 (FIG. 12) of triangular solid configuration is secured between wall 15 and the bottom of side flap member portion 59 and the side 23a of casing 29. The bellows seal 112 includes an accordian-pleated bellows 113 fabricated from flexible waterproof fabric, such as vinyl coated canvas or the like, and it has air vents 114 on its underside to permit air to be expelled when bellows 113 is compressed and which permits air to enter bellows 113 when it expands. The opposite ends of bellows 113 are closed by end sheets 115. In its installed position, the upper side 118 (FIG. 12) slopes downwardly to shed rain and snow.

Bellows seal 112 is installed in the following manner. A substantially triangular block of wood 116 (FIGS. 2 and 12) is suitably secured to building wall 15. A triangular piece of hook or pile fabric 117 is permanently secured to the face 119 of block 116. A mating piece of hook or pile fabric 120, having its attachment fabric facing the face 121 of member 117, has its side 122 permanently secured to end panel 115 adjacent thereto. A mirror image counterpart 120' of triangular member 120 has hook or pile fabric 122' on its face thereof, and the face which corresponds to face 122 of member 120 is fixedly secured to end panel 115 adjacent thereto. A triangular piece of hook or pile fabric 117', which is the mirror image counterpart of member 117, is fixedly secured to the lower portion of side flap member 59 and its hook or pile face faces the mating face of member 120'. The hook and pile fabric is commonly known under the trademark VELCRO and one section has hook fabric and the other part has pile fabric so that when the hook and pile are pressed together, they will provide a good attachment which can be opened by pulling the parts apart, as is well known.

Figures 12, 13:
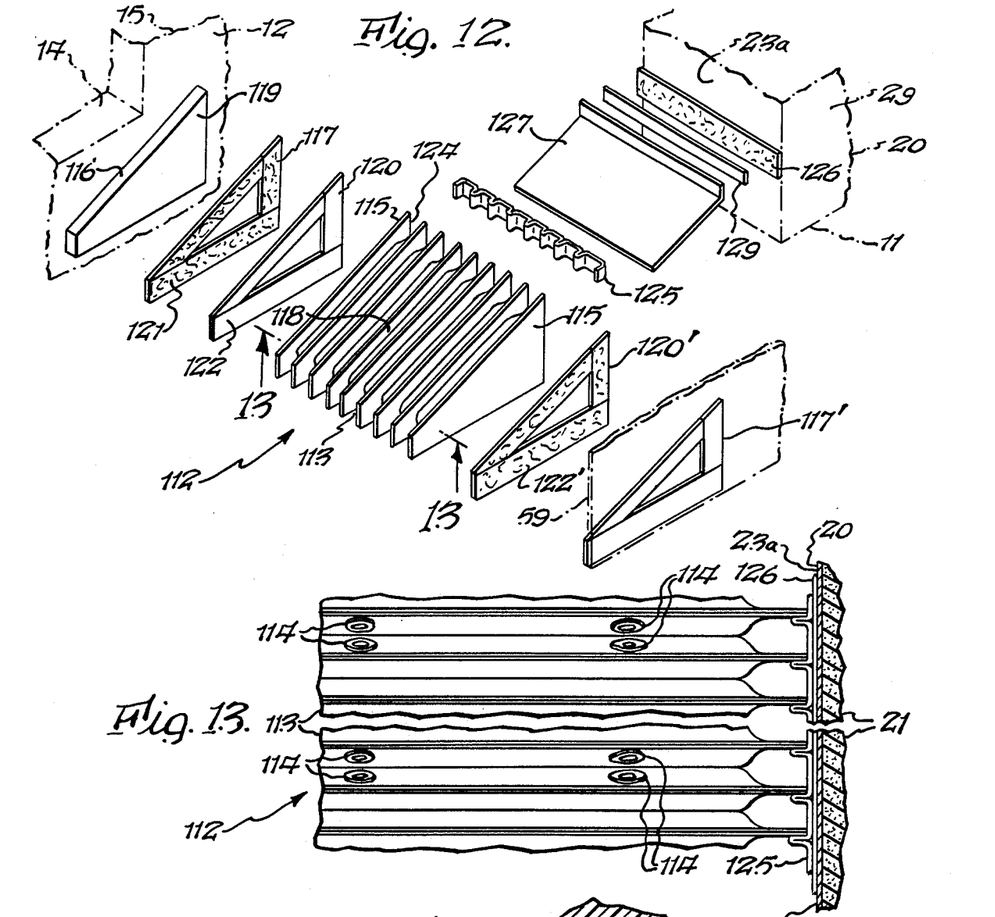
FIG. 12 is an exploded view of the bellows seal and associated parts relative to the building and side member.
FIG. 13 is a fragmentary plan view of the bellows seal taken substantially along lines 13—13 of FIGS. 1 and 12.

The upper edge 124 of bellows member 113 has a strip of hook or pile fabric 125 sewn thereto, as shown in FIG. 13. A mating strip 126 of hook or pile fabric is fixedly secured to portion 23a of side member 11. The upper rear edge 124 of bellows member 113 is secured to hook or pile fabric member 126 by being connected thereto by hook or pile fabric member 125. A cover flap 127 has a piece of hook or pile fabric 129 fixedly secured thereto with its connecting surface facing mating hook or pile fabric 126 so that flap 127 can be placed in overlying relationship to a portion of bellows 113, as shown in FIG. 2. A mirror image counterpart of bellows seal 112 is shown at 112' in association with flap 59' of flap member 54'.

Figure 15:
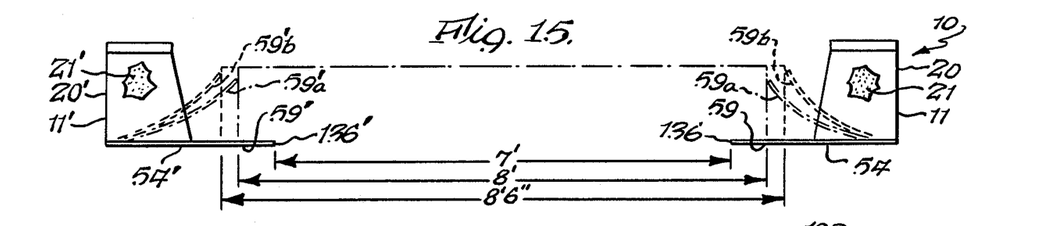
FIG. 15 is a schematic view showing how trucks of different widths deflect the pad members and flap members of the combined seal and shelter of the present invention when the trucks are in properly centered position.
Figure 16:
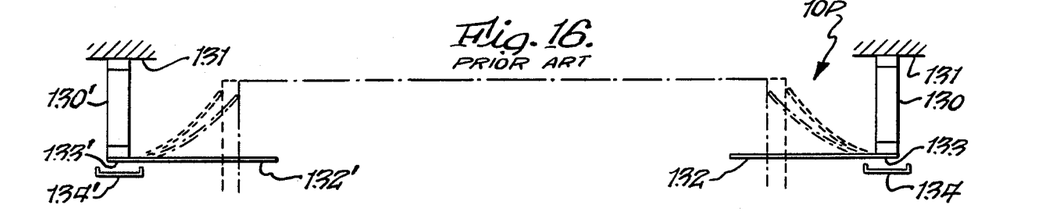
FIG. 16 is a schematic view showing how the flaps of a prior art dock shelter are deflected by trucks of different widths when the trucks are in proper position.
Figure 17:
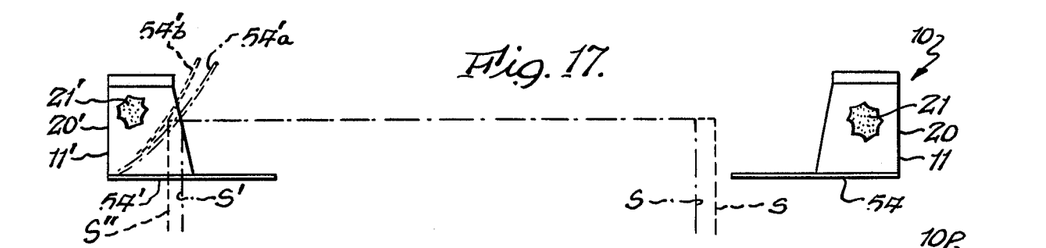
FIG. 17 is a view similar to FIG. 15 but which shows how the pad members and flap members of the combined dock seal and shelter of the present invention are deflected when the trucks are off-center by a certain amount but square with the building doorway.
Figure 18:
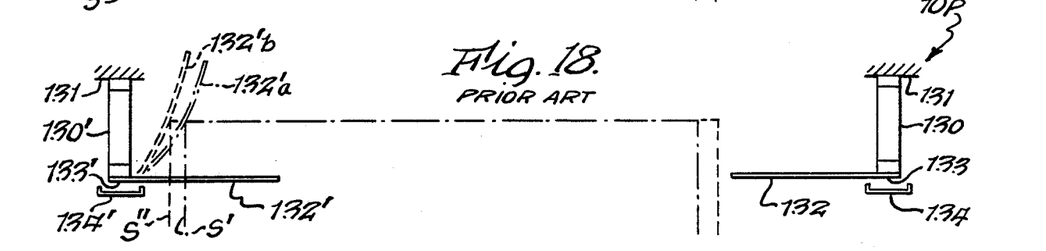
FIG. 18 shows how the prior art dock shelter flaps are deflected when the trucks are in the same position as in FIG. 17.
Figure 19:
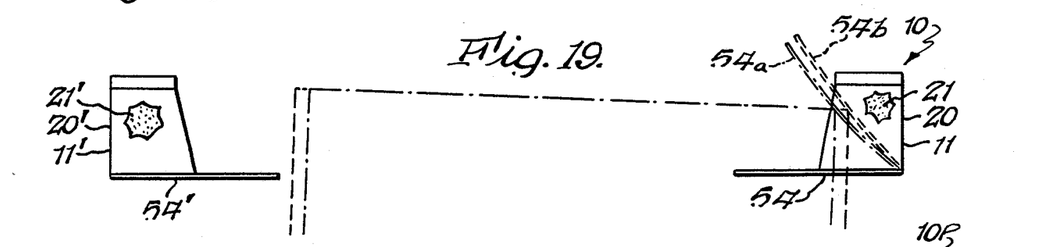
FIG. 19 is a schematic view showing how the pad members and flap members of the combined dock seal and shelter of the present invention are deflected when the trucks of two sizes are cocked relative to the doorway.
Figure 20:
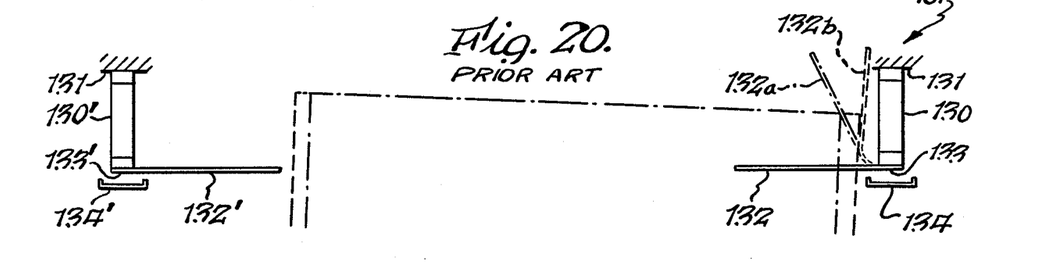
FIG. 20 is a view showing how the side flaps of a prior art dock shelter are deflected when the trucks are in the same position as in FIG. 19.

The manner in which the combined dock seal and shelter of the present invention operates can best be seen from FIGS. 15, 17 and 19, especially when it is compared to the prior art type of dock shelters shown in FIGS. 16, 18 and 20.

For a better understanding of the combined dock seal and shelter 10 of the present invention, the structure of the prior art dock shelter 10P will be briefly described. Actually, it essentially consists of two vertical wooden frames 130 and 130' which are shown in plan in FIG. 16 and which are secured to building wall 131 on opposite sides of a doorway. Flexible fabric sheets 132 and 132' have their ends 133 and 133' fixed to the front of frames 130 and 130', respectively. The fabric members 132 and 132' have fiberglass stays extending horizontally to bias members 132 and 132' to their solid line positions. Steel guards 134 and 134' are attached to the building wall underneath members 130 and 130', respectively, and extend out in front of portions 133 and 133' to prevent a truck from hitting frames 130 and 130' if the truck is not properly aligned with the doorway of the building.

The manner in which the combined seal and shelter 10 (FIG. 15) operates is shown in FIGS. 15, 17 and 19. More specifically, the inner ends 136 and 136' of side flap members 54 and 54' are preferably spaced seven feet apart. When a 8-foot wide truck is properly aligned with side flap portions 59 and 59', it will deflect them to the positions 59a and 59'a. As can be seen, the side pad members 20 and 20' will compress more than the side flap members 54 and 54' will bend. Thus, side flap members 54 and 54' will not be bent beyond their elastic limit, and the combined pressure exerted by core members 21 and 21' and the natural resiliency of side flap members 54 and 54' will cause all the parts to return to their solid line positions from the dot-dash line positions 59a and 59'a when an 8-foot truck no longer biases the side flaps to positions 59a and 59'a.

When an 8½-foot wide truck is properly centered and backed up in position against bumpers 137, the side flap members 54 and 54' will be deflected to the dotted line positions 59b and 59'b. When this occurs, the cores 21 and 21' will be compressed to the condition shown in FIG. 15. Even when there is this much compression, the side flap members 54 and 54' will still remain fairly straight, that is, they will not be bent beyond their elastic limit. When the 8½-foot truck leaves the loading dock, all parts will return to the solid-line positions shown in FIG. 15.

The reason that the combined dock seal and shelter side members 11 and 11' function in the foregoing manner is because the foam cores 21 and 21' have less resistance to compression than the resistance side flap members 54 and 54' have to bending. Therefore, the side pad members 20, 20' will compress more than the side flap members 54 and 54' will bend. The foregoing action is further enhanced becuase of the acute angle at the junction of sides 23 and 24 (FIG. 2) of the pad member which causes the portion of core 21 proximate the junction of sides 23 and 24 to be very flexible so that this corner will yield or distort more easily than the flap member will bend or distort in this area. In other words, while the compressibility of the foam core itself will produce the action described above relative to FIG. 15, the shape of the corner at the junction of sides 23 and 24 enhances this action. However, as noted above, the combined tendency for the side pad members 20 and 20' and the side flap members 54 and 54' to return to their original unstressed conditions will provide a good sealing arrangement with the sides of the truck.

When either an 8-foot wide truck or an 8½-foot wide truck is backed up against bumpers 137, there will still be approximately four inches space between the rear of the truck and the building. However, bellows seal assembly 112 in its fully compressed state is less than four inches thick. Therefore, bellows 113 is never placed under extreme stress. It merely adjusts to whatever space it is necessary for it to occupy. Furthermore, as can be visualized from FIG. 2, the bellows 113 can be distorted to practically any shape whatsoever while still maintaining a connection at its opposite ends and along its upper side next to the side pad. Therefore, it should never be subjected to the types of stresses which can cause it to wear out. Stated more specifically, from FIG. 2 it can be seen that the edge of the bellows seal closest to the door opening can be compressed to the point where it does not occupy any more than four inches while the opposite side in contiguous relationship to pad member 11 need not be compressed much at all, yet the bellows 113 can accommodate this distortion.

In FIG. 17, the deflection of the side members is shown when both an 8-foot wide truck and an 8½-foot wide truck is square with the building but off center relative to the side members. The side S' of an 8-foot wide truck which is off center will deflect side flaps 54' to the position 54'a but the side S of this truck will miss the other side flap 54 completely. Even though the side flap is moved to the position 54'a, which is more than the position 59'a in FIG. 15, the core 21' of the side pad will compress sufficiently so as to tend to maintain side flap 54'a in only a slightly curved condition. The same is true when the side S" of an 8½-foot truck is off center an amount which will cause the side panel to deflect to the position 54'b wherein core 21' is compressed an excessive amount but yet the side flap is only slightly bowed. When the trucks in the positions shown in FIG. 17 leave the loading dock, the combined dock seal and shelter side flaps 54 and 54' will return to the solid line positions shown in FIG. 17.

The improved operation of the present invention as explained in FIG. 17 can be more fully understood when it is compared to the prior art dock shelter as shown in FIG. 18 wherein the side flap 132' is deflected to positions, such as 132'a and 132'b under different conditions. Usually this amount of deflection is sufficient to stress the fiberglass stays beyond their elastic limit so that the side flaps are permanently distorted and will not return to the solid line position shown in FIG. 18.

In FIG. 19 the deflection of side pad 20 and side flap 54 are shown when different size trucks are cocked relative to the doorway. Insofar as pertinent here, the core 21 will be compressed while the side flap member 54 either moves to the position 54a or 54b in FIG. 19, and, in either event, the side flap member 54 is only slightly bowed because it is the core 21 which is more fully compressed because it has less resistance to compression than the side flap member 54 has to bending. When the trucks are removed from the position shown in FIG. 19, the side flap member 54 and pad member 11 will return to their solid line positions.

In contrast to the foregoing, as can be seen from FIG. 20, with a prior art type of dock shelter, the side flap 132 is deflected to the positions 132a or 132b when trucks of different widths are cocked the same amount off center relative to the doorway. In these circumstances it can be seen that the stays within the side flap 132 are stressed beyond their elastic limit so that the side flap is permanently distorted.

While the foregoing description has discussed the manner in which the side members 11 and 11' are distorted when a truck engages them, it will be appreciated that the head member 16 operates in the same manner. In this respect, the head flap member 70 will tend to merely become slightly bowed while the core 73 functions in the same manner as cores 21 and 21' of the side members 11 and 11', respectively.

In addition to all of the foregoing, if the side of the truck is grossly out-of-line with the doorway so that it abuts one of the side pad members 20 or 20', it will merely compress it without damage, and it will return to its normal unstressed condition after the truck leaves.

It will also be understood that it is the natural resiliency of the side pad members and the side flap members which return them to their normal unstressed conditions when the distorting forces are removed, and that their natural resiliencies are so great that they will return the bellows seals to their expanded conditions. In other words, the bellows seals will follow the side members 11 and 11' to their normal unstressed conditions, and will in no way impede their return to such unstressed conditions.

As noted briefly above, the slits 97 and 99 accommodate the corners of the trucks while the flaps 104 and 105 maintain a sealing relationship.

While the bellows seal members, such as 112, have been described for use with the combined, dock seal and shelter construction of the present invention, it will be appreciated that it can also be used with other styles of dock shelters which normally use triangular foam cushions which wear out rapidly in use.

While preferred embodiments of the present invention have been disclosed, it will be appreciated that it is not limited thereto but may be otherwise embodied within the scope of the following claims.

What is claimed is:

1. A combined dock seal and shelter for mounting on opposite sides of a doorway in a building wall comprising a pair of spaced side members including substantially parallel vertical elongated side pad members having longitudinal axes and compressible flexible resilient cores, first sides on said side pad members for placement in contiguous relationship to said building wall, second sides on said side pad members on the opposite sides of said side pad members from said first sides for placement in spaced relationship to said building wall, third sides on said side pad members facing each other and extending transversely to said first and second sides, securing means for securing said side pad members to said building wall, said cores having a first resistance to compression from a normal unstressed condition, elongated flexible resilient substantially planar sheet-like side flap members having a width which includes first and second portions which are continuations of each other, means securing said first portions on said second sides of said side pad members with said second portions extending beyond said second sides toward each other for providing spaces between said second portions and said building wall, said third sides intersecting said side flap members at the junctions of said first and second portions, said side flap members having a second resistance to deflection from a normal unstressed condition in a direction about said longitudinal axes throughout sufficient portions of said first and second portions which is greater than said first resistance to compression so that when forces are applied to said second portions of said side flap members along paths which are substantially parallel to said longitudinal axes said first and second portions of said side flap members will compress said elongated pad members primarily at the junctions of said second and third sides because said elongated side pad members have said first resistance to compression which is less than said resistance to deflection of said side flap members throughout said sufficient portions of said first and second portions.

2. A combined dock seal and shelter as set forth in claim 1 wherein said elongated flap members are more flexible from top-to-bottom than from side-to-side.

3. A combined dock seal and shelter as set forth in claim 1 wherein said second portions of said side flap members have lower portions, hollow bellows seal means for sealing said spaces between said lower portions of said second portions and said building wall, first and second ends on said bellows seal means, first means for securing said first ends to said lower portions of said second portions of said side flap members, and second means for securing said second ends to said building wall.

4. A combined dock seal and shelter as set forth in claim 1 wherein said third sides on said side pad members extend at acute angles to said second sides.

5. A combined dock seal and shelter as set forth in claim 1 wherein said cores of said side pad members comprise resilient foam material, and wherein said side flap means comprise a plastic sheet material with horizontally extending elongated metal members embedded therein.

6. A combined dock seal and shelter as set forth in claim 1 wherein said first and second portions of said side flap members are uniformly flexible throughout their extent about horizontal axes, and wherein said first portions of said substantially planar sheet-like members are in substantially direct abutting relationship with said second sides of said side pad members without substantially more rigid members therebetween to permit forces which distort said first portions about said horizontal axes to be transmitted directly through said first portions of said side flap members to distort said side pad members about horizontal axes in substantially the same manner.

7. A combined dock seal and shelter as set forth in claim 6 wherein said elongated side flap members are more flexible in their entireties about said horizontal axes than said vertical axes.

8. A combined dock seal and shelter as set forth in claim 1 wherein said side flap members have lower portions, seal means for sealing said spaces between said lower portions of said second portions and said building wall, first and second ends on said seal means, first means for securing said first ends to said lower portions of said second portions of said side flap members, and second means for securing said second ends to said building wall.

9. A combined dock seal and shelter as set forth in claim 8 wherein each of said seal means comprises a flexible hollow member which follows said flexible resilient pad members and said flexible resilient flap members to their normal unstressed conditions after forces which stress said pad members and said side flap members are removed therefrom.

10. A combined dock seal and shelter as set forth in claim 1 including a horizontal head member including a head pad member located above said side members, a fourth side on said head member for placement in contiguous relationship to said building wall, a fifth side on the opposite side of said head member from said third side and lying in substantially the same plane as said second sides, a head flap member having first and second portions, means securing said first portion of said head flap member on said fifth side with said second portion of said head flap member extending downwardly beyond said horizontal head pad member and overlapping said second portions of said side flap members.

11. A combined dock seal and shelter as set forth in claim 10 including spaced vertical slits in said second portion of said head flap member in the areas of said second portions of said side flap members.

12. A combined dock seal and shelter as set forth in claim 11 including additional flap members secured between said head flap member and said side flap members and located behind said slits.

13. In a building construction having a door opening and side wall portions on opposite sides of said door opening, a dock shelter construction comprising a pair of spaced side members, means mounting said side members on said side wall portions, flap members having upper and lower portions, means mounting a flap member on each of said side members, overhanging flap portions of said flap members extending inwardly toward each other from said side members and spaced from said side wall portions, bellows seal means comprising hollow bellows-like members for sealing the spaces between said overhanging portions and said side wall portions, and attachment means affixing said bellows seal means between said lower portions of said overhanging flap portions and said side wall portions.

14. In a building construction as set forth in claim 13 wherein said bellows seal means comprise hollow accordian-pleated members.

15. In a building construction as set forth in claim 13 wherein said attachment means comprise detachable connections between said bellows seal means and said overhanging flap portions.

16. In a building construction as set forth in claim 13 wherein said attachment means comprise detachable connections.

17. In a building construction as set forth in claim 13 including an elongated head member above said side members and extending in a direction substantially perpendicularly thereto.

18. In a building construction as set forth in claim 17 including a head flap member extending downwardly from said head member.

19. In a building construction as set forth in claim 13 wherein said side members comprise elongated foam pads.

20. In a building construction as set forth in claim 19 wherein said flap members comprise planar sheet material which has a greater resistance to bending than said foam pads have to compression.

21. In a building construction as set forth in claim 20 including a head member extending across said side members.

22. In a building construction as set forth in claim 21 wherein said head member includes an elongated foam head pad extending in a direction substantially perpendicularly to said elongated foam pads.

23. In a building construction as set forth in claim 22 including a head flap member extending downwardly from said elongated foam head pad.

24. In a building construction as set forth in claim 23 wherein said head flap member has a greater resistance to bending about a horizontal axis than said head pad has to compression.

25. In a building construction as set forth in claim 23 wherein said head flap member has a second overhanging flap means extending downwardly from said head pad between said head flap member and said flap members.

26. In a building construction as set forth in claim 25 including a pair of spaced vertical slits in said head flap member located proximate said flap members, and wherein said second overhanging flap means are located between said vertical slits and said flap members.

27. A dock shelter construction comprising a pair of spaced side members, a flap mounted on each of said side members and extending toward each other from said side members and having lower ends, and a bellows seal means mounted at said lower ends of each of said flaps for providing a seal at said lower ends, said bellows seal means being a hollow bellows-like member.

28. A dock shelter construction as set forth in claim 27 wherein said bellows seal means at the lower end of each of the flaps is of accordian-pleated construction.

29. A bellows seal for attachment between a flap of a dock shelter and a building wall comprising hollow expandible and contractible accordian-pleated body means for providing a seal between said flap of said dock shelter and said building wall, first and second opposite ends on said body means, vent means in said body means for permitting air to enter said body means when it expands and for permitting air to discharge from said body means when it contracts, first attachment means on said first end for attaching said body means to said building wall, and second attachment means on said second end for attaching said body means to said flap of said dock shelter.

30. A bellows seal for a dock shelter as set forth in claim 29 wherein said body means is of triangular cross-sectional configuration.

31. In combination, a dock shelter and a bellows seal, said dock shelter including flap means which are to be spaced from a building wall, an outer side on said flap means for engagement by the rear end of a truck, an inner side on said flap means for facing said building wall, and said bellows seal comprising hollow expandible and contractible accordian-pleated body means for providing a seal between said inner side of said flap means and said building wall, first and second opposite ends on said body means, vent means in said body means for permitting air to enter said body means when said body means expands and for permitting air to be discharged from said body means when it contracts, first attachment means on said first end for attaching said accordian-pleated body means to said inner side of said flap means, and second attachment means for attaching said accordian-pleated body means to said building wall.

* * * * *

UNITED STATES PATENT AND TRADEMARK OFFICE
CERTIFICATE OF CORRECTION

PATENT NO. : 4,799,342
DATED     : January 24, 1989
INVENTOR(S) : Joseph P. H. Kleynjans It is certified that error appears in the above-identified patent and that said Letters Patent is hereby corrected as shown below:

On the cover page, the inventor's name should correctly read --Joseph P. H. Kleynjans--.

Column 3, line 11, change "veiw" to --view--.

Column 9, line 41 (claim 2), after "elongated" insert --side--.

Column 10, line 56 (claim 13), change "of" to --on--.

Signed and Sealed this

Twentieth Day of June, 1989

Attest:

DONALD J. QUIGG

*Attesting Officer*      *Commissioner of Patents and Trademarks*